United States Patent [19]

Han

[11] Patent Number: 4,760,666

[45] Date of Patent: Aug. 2, 1988

[54] WATERING DEVICE FOR PLANTS

[76] Inventor: Joonho Han, 816 Gregorio Dr., Silver Spring, Md. 20901

[21] Appl. No.: 43,756

[22] Filed: Apr. 29, 1987

[51] Int. Cl.$^4$ .......................... A01G 25/00; A01G 9/02
[52] U.S. Cl. ................................................ 47/79; 47/67
[58] Field of Search ........................... 47/67, 48.5, 79; 137/406, 419, 421, 424; 222/58, 79

[56] References Cited

U.S. PATENT DOCUMENTS

| 91,413 | 6/1869 | Burley | 137/406 |
|---|---|---|---|
| 2,198,309 | 4/1940 | James | 47/79 |
| 4,060,934 | 12/1977 | Skaggs | 47/79 |

FOREIGN PATENT DOCUMENTS

| 841340 | 1/1938 | France | 47/79 |
|---|---|---|---|
| 1070140 | 1/1953 | France | 47/79 |

Primary Examiner—Robert A. Hafer
Attorney, Agent, or Firm—Birch, Stewart, Kolasch & Birch

[57] ABSTRACT

A watering device for plants comprises a plant container which is balanced on a horizontal pivot rod by an adjusting weight member. A water reservoir tank is operatively associated with the plant container so that as the plant container becomes lighter as to a loss of water. The adjusting weight member disposed at the opposite end of the horizontal pivot rod from the plant container actuates a valve in the water reservoir tank and transfer water from the water reservoir tank to the plant container until a balance is again achieved. When the balance is reached, the valve in the water tank is again closed.

6 Claims, 1 Drawing Sheet

WATERING DEVICE FOR PLANTS

BACKGROUND OF THE INVENTION

The present invention relates to a watering device for plants which are grown in the home or in a greenhouse and more particularly, to an improved automatic watering device responsive to water loss by the plants.

There are many types of automatic plant watering apparatus which are well known in the prior art which utilize a system which is actuated in response to water loss by the plants. However, these apparatus suffer from a number of disadvantages such as, for example, they require complex mechanisms to operate and they are difficult to install in that a variety of complex apparatus are required to assemble them. Furthermore, they are provided with an elevated water reservoir with a spring loaded valve therein which is actuated by the loss of weight of water by the plants in a container supported by the spring. Since the springs lose their strength as the temperature increases, plants are frequently overwatered on hot days. In addition, there are several types of apparatus which utilizes a counter weight member in such as disclosed in U.S. Pat. No. 4,060,934. Such apparatus, however, are used with a plant container which must be placed on the floor or ground. They cannot be utilized with plant containers which must be hung from a ceiling, a wall or the like.

OBJECTS AND SUMMARY OF THE INVENTION

Accordingly, it is an object of the present invention to provide an improved watering device for plants.

Another object of the present invention is to provide an automatic watering device responsive to water loss by the plants which are grown in the home or in a greenhouse.

Yet another object of the present invention is to provide a watering device for hanging plants, which is structured with a horizontal pivot rod to which is slidably mounted an adjusting weight member and a plant container disposed at opposite end portion thereof so that the plant container can be automatically watered by sensing the amount of water weight loss in the plant container.

A further object of the present invention is to provide a watering device for plants, which is easy to assemble or operate and inexpensive to manufacture.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to a watering device for plants which comprises a plant container which is balanced on a horizontal pivot rod by an adjusting weight member. A water reservoir tank is operatively associated with the plant container so that as the plant container becomes lighter as to a loss of water. The adjusting weight member disposed at the opposite end of the horizontal pivot rod from the plant container actuates a valve in the water reservoir tank and transfer water from the water reservoir tank to the plant container until a balance is again achieved. When the balance is reached, the valve in the water tank is again closed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
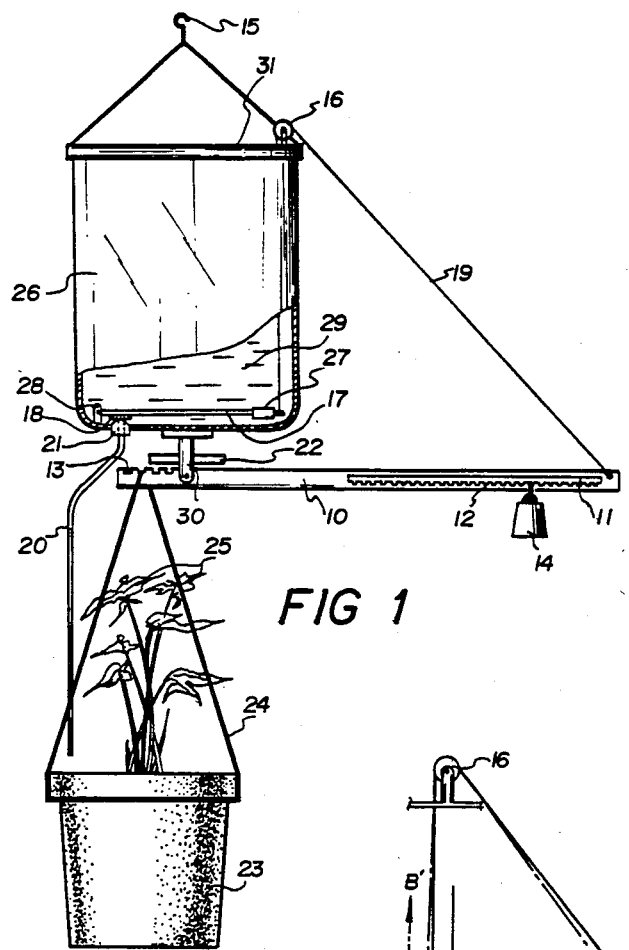
FIG. 1 is a side view of the automatic watering device for plants of the present invention.
Figure 2:
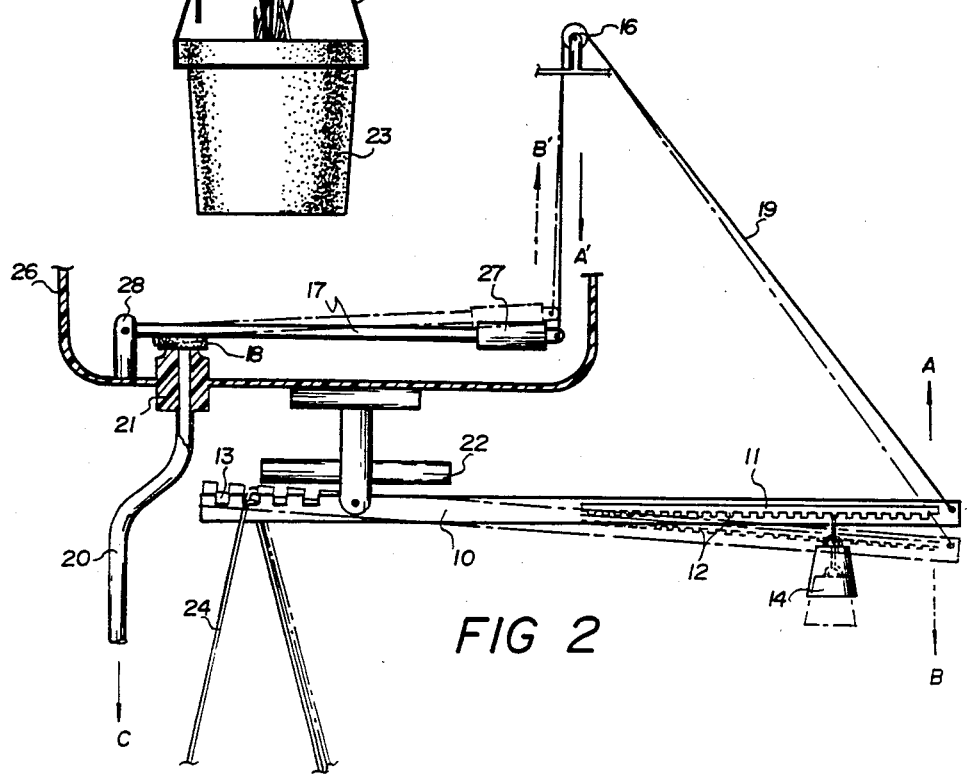
FIG. 2 is a side, partial sectional view of the basic components of the present invention showing the operation thereof.

Referring now in detail to the drawings for the purpose of illustrating the present invention, the watering device for plants as shown in FIGS. 1 and 2 comprises a horizontal pivot rod 10 including a channnel 11 disposed at the right end portion, a plurality of slots 13 disposed at the left end portion thereof, and a water reservoir tank 26 disposed over the horizontal pivot rod 10. The horizontal pivot rod 10 is pivotably provided at one portion thereof with a T-shaped supporting member 30 for supporting the water reservoir tank 26. The T-shaped supporting member 30 is also provided with a fixed rod 22 for limiting the pivotal action of the horizontal pivot rod 10. The channel 11 is provided with a plurality of teeth 12 disposed at the low portion thereof for adjusting the position of an adjusting weight member 14.

The water reservoir tank 26 supported by the T-shaped supporting member 30 contains a drain hole member 21 disposed at the bottom thereof. The drain hole member 21 is adapted to receive a drain pipe 20 for draining the water 29 from the water reservoir tank 26 to plants 25 in a plant container 23. Also, the water reservoir tank 26 contains a stand 28 which is pivotably connected to one end of a rod 17. The rod 17 is provided with a rubber valve 18 attached to the left end portion thereof for mating with the drain hole member 21 to open and close the drain hole member.

The rod 17 is provided with a fixed weight member 27 attached to the right end portion thereof for closing the drain hole member 21, utilizing the rubber valve 18, by gravity of the fixed weight member 27. The right end of the horizontal pivot rod 10 connects to the right end of the rod 17 by a string or a wire 19 which passes through a roller 16 disposed at the top portion of the water reservoir tank 26. The water reservoir tank 26 is provided with a hook 15 for hanging the tank 26 on a wall, a ceiling or the like. A loop 24 is attached to the plant container 23 for hanging the container 23 from slots 13 disposed in the left end portion of the horizontal pivot rod 10.

In operation, the water reservoir tank 26 containing water 27 and assembled with a valve system therein is hung from a special area such as a ceiling. After then, the plant container 23 with plants 25 and containing a proper amount of water is hung from one of the slots 13 in the horizontal pivot rod 10. At this time, the adjusting weight member 14 is placed in the teeth 12 of the appropriate channel 11 so as to balance the weight of the plant container 23.

As the water is gradually lost from the plant container 23, that is, the weight of the plant container 23 becomes lighter than its original weight, the right end of the horizontal pivot rod 10 is lowered in the direction indicated by arrow B, as shown in FIG. 2, due to the adjusting weight member 14. The string 19 thus, pulls the rod 17 in the direction as indicated by arrow B' which opens the rubber valve 18 permitting water 29 to drain from the water reservoir tank 26 to the plant container 23 through the drain pipe 20 in the direction as indicated by arrow C (FIG. 2). As soon as the water 29 is sufficiently supplied to the plant container 23 to balance the plant container 23 against the adjusting weight member 14, the rubber valve 18 closes the drain hole member 21 to stop the flow of water 27 to the plant container 23.

Accordingly, the device of the present invention automatically waters the plant container in a predetermined amount of water required for the plant. Thus, there is no need to manually water the plant since the device of the present invention automatically waters the plant until the water is exhausted which usually takes one to two months.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An autmoatic watering device for plants adapted to suspended from a wall or ceiling which comprises:
    a horizontal pivot rod including a plurality of slots disposed at the end portions thereof, a plant container hanging from the slots at one end portion of the horizontal pivot rod, said horizontal pivot rod being pivotably provided at one portion thereof with a T-shaped supporting member for supporting the water reservoir tank, said T-shaped supporting member being provided with a fixed rod for limiting the pivotal action of the horizontal pivot rod,
    an adjusting weight member hanging a channel disposed at the other end portion of the horizontal pivot rod, said adjusting weight member and said plant container being positioned in said slots to balance each other,
    a water reservoir tank adapted to contain a supply of water, said horizontal pivot rod being pivotably attached to said water reservoir, said water reservoir tank containing transfer means for conveying water from said water reservoir tank to said plant container, and
    valve means operatively associated with said transfer means for controlling the conveyance of water from said tank to said plant container, said valve means being connected to said horizontal pivot rod, whereby upon the loss of water from the plant container, the horizontal pivot rod is caused to pivot, which opens the valve means permitting water to flow through the transfer means to the plant container until the balance is re-established causing the valve to close.

2. The automatic watering device of claim 1 wherein the channel is provided with a plurality of teeth disposed at the low portion thereof for adjusting the position of the adjusting weight member.

3. The automatic watering device of claim 1 wherein the transfer means is an aperture provided in the bottom of the water reservoir tank and conduit means extending from said aperture to the plant container, said valve means being adapted to open and close said aperture depending on the balance portion of the horizontal pivot rod.

4. The automatic watering device of claim 1 wherein the valve means includes a rod which is provided with a valve attached to one end portion and a weight member attached to the other end portion for closing a drain hole disposed in the left side bottom surface of the water reservoir tank, utilizing the valve means, by gravity of the weight member.

5. The automatic watering device of claim 1 wherein the horizontal pivot rod is connected to the rod by a wire which passes through a roller disposed at the top portion of the water reservoir tank.

6. The automatic watering device of claim 4 wherein the drain hole is adapted to receive a drain pipe for draining water from the water reservoir tank to the plant container.

* * * * *